July 14, 1964        G. J. KLOSE        3,141,095
NOISE REDUCTION APERTURE FOR RADIANT ENERGY APPARATUS
Filed Oct. 2, 1961        2 Sheets-Sheet 1
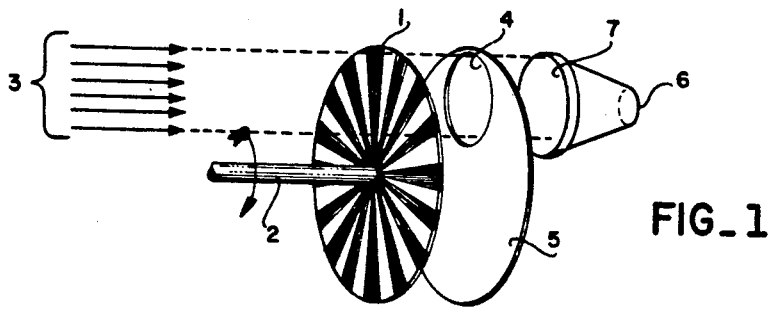
FIG_1
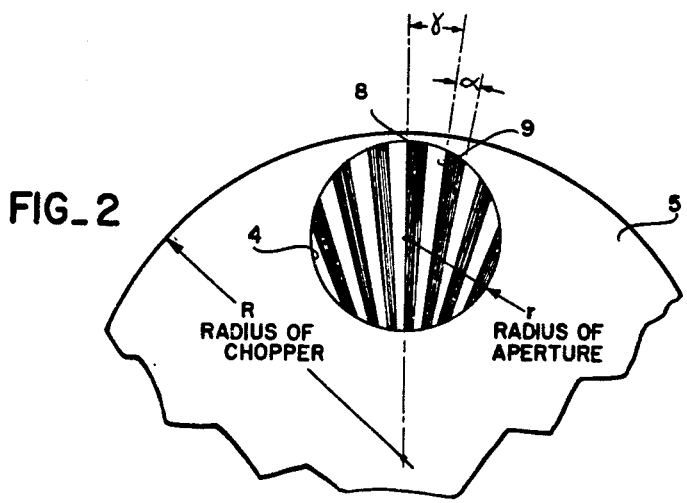
FIG_2
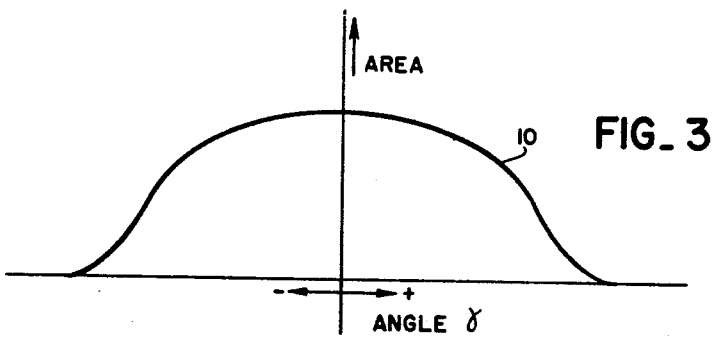
FIG_3
INVENTOR.
GEORGE J. KLOSE
BY
*George C. Sullivan*
Agent

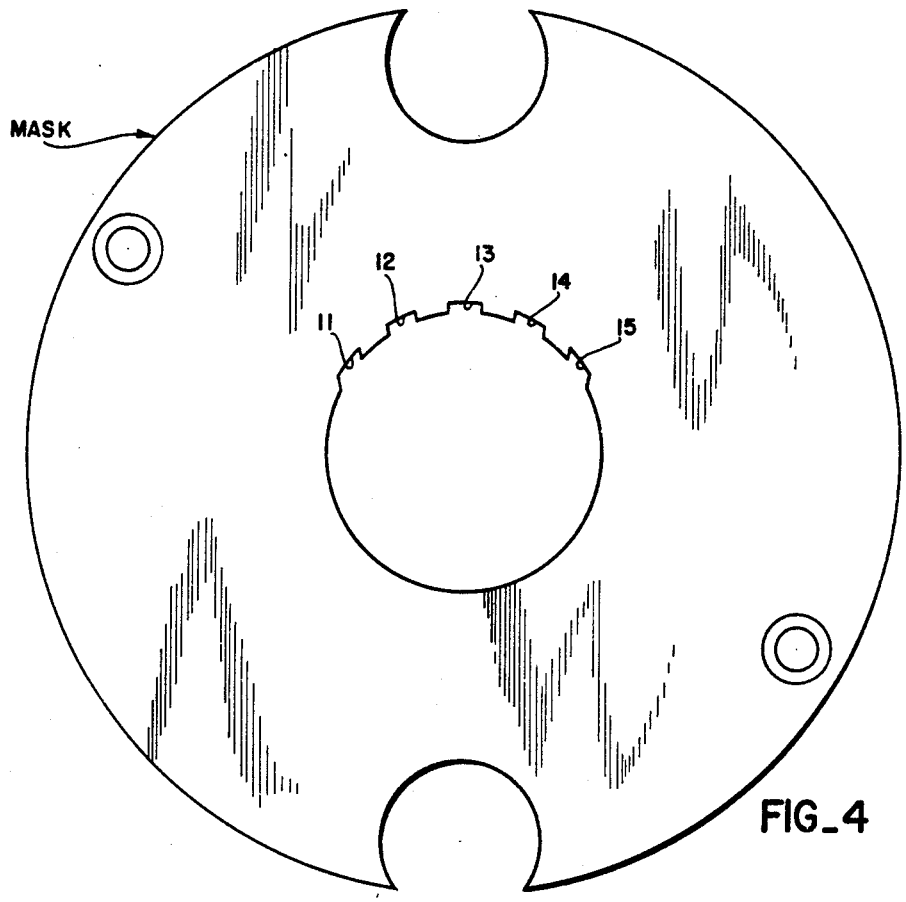
FIG_4
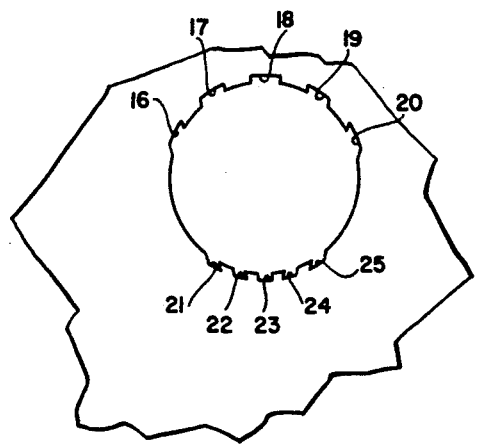
FIG_5
*INVENTOR.*
GEORGE J. KLOSE 3,141,095
Patented July 14, 1964

3,141,095
NOISE REDUCTION APERTURE FOR RADIANT ENERGY APPARATUS
George J. Klose, Orange, Calif., assignor to Lockheed Aircraft Corporation, Burbank, Calif.
Filed Oct. 2, 1961, Ser. No. 142,139
5 Claims. (Cl. 250—233)

The present invention relates to radiant energy apparatus and more particularly to a modulator for such apparatus employing a moving modulator, and an aperture therefor, of novel configuration for reducing background noise arising from uniform radiation.

The present invention is particularly useful with light modulators, both visible and infrared. Typical light modulators employ a rotating disc having alternately arranged opaque and transparent areas which are caused to move in front of an aperture thereby cyclically chopping or modulating the light falling on a photosensitive detector. Modulators of these types are subject to noise resulting from radiation from a uniform background. This noise arises from reoccurring or cyclical signal changes caused by the chopping member when irradiated with uniform radiant energy.

This periodic noise may be eliminated by maintaining a substantially constant ratio between the opaque and the transparent areas of the modulating disc. However, conventional chopper discs having radial or involute bars crossing the field of view do not present a constant ratio of opaque and transparent areas, since the area covered by the transparent bars, and therefore the energy output from the detector changes periodically, thus creating the unwanted signal. One method of eliminating this signal would be to shape the aperture in such a way that the area exposed by the transparent bars remains substantially constant. To this end, it has been proposed heretofore to employ a rectangular aperture with a linear scan or a "pie-shaped" or wedge-shaped aperture with a radial scan. However, other than a circular aperture is inefficient, inconvenient to fabricate and work with, and requires larger field lenses. Furthermore, since the chopping frequency depends, to a degree, upon the diameter of the aperture, calculation of other than a circular aperture is made more difficult.

To overcome these and other shortcomings of prior devices there is provided by the present invention a novel circular aperture which, in conjunction with a rotating chopper disc, will result in a substantially constant ratio of transparent to opaque areas of said disc.

It is therefore a principal object of the invention to provide noise reduction means in an optical modulator for eliminating cyclical noise in the absence of an input signal.

Another object of the invention is to provide a modulated photoelectric transducer system having no cyclical output in the presence of uniform background input.

A general object of this invention is to provide a new and improved radiant energy modulator which overcomes disadvantages of previous means and methods heretofore intended to accomplish generally similar purposes.

These and other objects of the invention will be more readily understood upon consideration of the following specification taken in conjunction with the drawings, in which:

FIGURE 1 is a typical radiant energy scanning mechanism of the prior art.

FIGURE 2 is a schematic diagram of an aperture, as seen by the detector, useful in analyzing the dynamic characteristics of the apparatus of FIGURE 1.

FIGURE 3 graphically indicates the area of one slit exposed through the aperture of the apparatus of FIGURE 1, as a function of angular displacement over a given interval time.

FIGURE 4 is a front elevational view of a preferred embodiment of the mask and aperture of the present invention.

FIGURE 5 is a modification of the apparatus of FIGURE 4.

The apparatus of the present invention is useful in radiant energy scanning systems of the type described in Patent No. 2,931,912 to Macleish or the Tracker For Moving Objects as described in Patent No. 2,691,545 to Astheimer et al. These prior devices relate to radiant energy responsive seeking and tracking mechanisms employing scanning discs. The scanning apparatus is utilized for chopping images, beams, or rays which fall upon radiant energy responsive devices. More particularly, the disc modulates the radiant energy from the radiant target as it falls upon the radiant energy responsive device, thus permitting the presence of the target to be detected. In certain systems of this type, the generated target signal can be compared to a reference voltage otherwise generated in such a manner that the direction of deviation of the target's line of sight from the optical axis of the scanning apparatus—that is, from the center of the scanning disc—can be ascertained. In addition to the modulated signal representing the target, there is also generated a modulated signal representing modulation of the background being viewed through the optical part of the system. Assuming that the radiant target comprises an aircraft viewed against the sky, the sky background, as normally viewed will have a considerable radiometric brightness. The chopping or scanning of the sky background results in the generation of unwanted signals of relatively high amplitude and low frequency. The noise frequency caused by the brightness of the sky background coincides with the scanning frequency.

Obviously, it is desirable to minimize or eliminate the noise signal resulting from sky background or other large area radiant background. In order to achieve this objective, it has been proposed heretofore to employ a moving chopper having an integral number of pairs of opaque bars and transparent openings used in conjunction with a stationary aperture having wide edges which are straight radial lines. However, in a practical device, this is not feasible since it would operate perfectly only if the edges of the aperture mask were radially straight and subtend exactly an integral number of pairs.

Looking now at FIGURE 1, there is shown a typical scanning mechanism for cyclically interrupting a beam of radiant energy falling on an energy responsive device. The apparatus comprises a rotating chopper disc 1 rotatably supported on shaft 2 which is driven from a motor (not shown) in any suitable and well-known manner.

A portion of the beam 3 passing through the chopper disc 1 passes through aperture 4 in stationary mask 5 and is focused onto the sensitive surface of detector 6 by means of field lens 7. As shown in FIGURE 2, the chopper disc has a plurality of alternating opaque and transparent sectors or bars; a typical opaque bar is identified by reference numeral 8 and a typical transparent bar is identified by reference numeral 9. As the chopper bars move across the aperture 4, the area covered by the transparent sectors, and therefore the energy reaching the detector, changes periodically thus creating a cyclic signal.

The varying area of the effective aperture is shown in FIGURE 3 in which the curve of the exposed area versus angle is plotted. Although the above discussion in connection with FIGURES 2 and 3 is stated in terms of a circular radial chopper, the principle applies to involute bars as well. To overcome this modulation of a wide field static background, the aperture may be shaped in such a way that the area exposed by the clear sectors remains constant or substantially constant.

Knowing the angular spacing between the sectors, as indicated by α in FIGURE 2, the total area exposed, and the variation with angle (indicated by γ), the unbalance can be calculated and plotted as in FIGURE 3. The maximum and minimum amplitudes of the curve 10 are found and the difference calculated. To facilitate the computation of the maximum and minimum exposures, consider a single transparent sector of width of α moving across the aperture with an angular displacement γ. The variation in exposure through the aperture will follow the shape of the curve of FIGURE 3. Knowing the angular location of the low point indicates where notches may be cut in the aperture to balance the area. There is shown in FIGURE 4 an aperture having a plurality of notches 11–15, one for each transparent sector overlying the aperture at any given instant. The area of the cut out notches (11–15) is made to equal the difference in area between the high and low areas of the plot shown in FIGURE 3. The width of the notches (11–15) equals the widths of the sectors 8 or 9. As can be seen from FIGURE 5, the notched area may be divided between notches 16–20 at the outer edge of the aperture and notches 21–25 at the inner edge of the aperture.

This notched configuration retains all of the advantages of a circular aperture yet does not have the disadvantage of unwanted modulation of a uniform radiant background.

While there has been shown and described the fundamental novel features of the invention as applied to preferred embodiments, it is to be understood that various changes in the form or details of the noise reduction apparatus means illustrated and in their operation may be made by those skilled in the art, without departing from the spirit of the invention; therefore, it is intended that the invention be limited only as indicated by the scope of the following claims.

What is claimed is:

1. A target scanning system responsive to a radiant energy emissive target appearing against a uniform radiant background comprising, an energy responsive detector, a scanning disc mounted for rotation and interposed between said target and said detector, means for rotating said scanning disc, said scanning disc including a plurality of angularly spaced, alternately arranged energy transparent and opaque areas extending from adjacent the center of rotation of said scanning disc in a generally radial direction, a mask interposed between said scanning disc and said detector and having aperture means therein whereby upon rotation of said disc the energy striking said detector from said target will be modulated by said scanning disc, said aperture having a plurality of angularly spaced notches, the angular spacing of which conforms with the angular spacing of said sectors whereby the area of exposure of said energy transparent sectors through said mask remains substantially constant while said scanning disc is rotated.

2. A target scanning system as defined in claim 1 having field lens means interposed between said mask and said detector for converging the radiant energy passing through said mask onto said detector.

3. A target scanning system as defined in claim 1 wherein said angularly spaced notches are divided into pairs with one notch of each pair being centered about a given radial and located at the edge of said aperture closest to said center of rotation and the other notch of each pair being centered about said given radial and located at the edge of said aperture farthest from said center of rotation.

4. In a radiant energy modulator having a rotating scanner of the type utilizing a plurality of angularly spaced, alternately arranged energy transparent and opaque sectors behind which is located a radiant energy responsive detector, noise reduction aperture means comprising, a mask interposed between said scanner and said detector and having a substantially circular aperture therein, a plurality of cutout portions along the periphery of said aperture, the area of said cutout portions being equal to the difference between the maximum and the minimum area of said transparent sectors overlying said aprture as said scanner rotates.

5. The method of fabricating a noise reduction aperture for a radiant energy modulator having a rotating scanner comprising alternately arranged transparent and opaque sectors behind which is located a radiant energy responsive detector with a mask interposed between said scanner and said detector, comprising the steps of: forming a circular aperture in said mask, measuring the difference between the maximum and minimum area of said transparent sectors overlying said aperture as said scanner rotates, and notching the edge of said aperture to increase the area thereof by an amount equal to said measured difference.

References Cited in the file of this patent

UNITED STATES PATENTS 3,007,053    Merlen  ---------------- Oct. 31, 1961
3,024,699    Chitayet  --------------- Mar. 13, 1962